US011015637B2

(12) United States Patent
Reznar et al.

(10) Patent No.: US 11,015,637 B2
(45) Date of Patent: May 25, 2021

(54) LEVELING BOLT AND RELATED METHODS

(71) Applicant: A. Raymond et Cie, Grenoble (FR)

(72) Inventors: Jason Reznar, Birmingham, MI (US); William Teller, Lake Orion, MI (US)

(73) Assignee: A. Raymond et Cie, Grenoble (FR)

( * ) Notice: Subject to any disclaimer, the term of this patent is extended or adjusted under 35 U.S.C. 154(b) by 407 days.

(21) Appl. No.: 15/946,979

(22) Filed: Apr. 6, 2018

(65) Prior Publication Data
US 2019/0309791 A1 Oct. 10, 2019

(51) Int. Cl.
*F16B 39/30* (2006.01)
*F16B 41/00* (2006.01)
*F16B 21/08* (2006.01)

(52) U.S. Cl.
CPC .......... *F16B 41/002* (2013.01); *F16B 21/084* (2013.01); *F16B 39/30* (2013.01)

(58) Field of Classification Search
CPC ............................ F16B 21/084; F16B 41/002
USPC ................................................. 411/308, 510
See application file for complete search history.

(56) References Cited

U.S. PATENT DOCUMENTS

| 5,169,033 A | | 12/1992 | Shay | |
|---|---|---|---|---|
| 5,536,068 A | * | 7/1996 | Valentor | A47C 3/38 297/183.1 |
| 5,697,586 A | * | 12/1997 | Lybarger | D06F 39/125 248/188.2 |
| 5,967,725 A | * | 10/1999 | Voges | F16B 35/00 411/302 |
| 6,186,453 B1 | * | 2/2001 | Redbone | A47B 91/024 16/42 R |
| 6,507,976 B2 | * | 1/2003 | Ichimaru | E05F 5/022 16/2.1 |
| 7,198,238 B2 | * | 4/2007 | Inoue | A47B 91/024 248/188.4 |
| 7,530,775 B2 | * | 5/2009 | Jaconelli | B60R 21/213 411/302 |
| 7,866,614 B2 | * | 1/2011 | Erdmann | A47L 15/4253 248/188.4 |
| 7,950,887 B2 | * | 5/2011 | Dietz | F16B 25/10 411/386 |
| 8,028,962 B2 | * | 10/2011 | Geiger | F16L 3/13 248/74.3 |

(Continued)

FOREIGN PATENT DOCUMENTS

EP 2302226 A1 3/2011

OTHER PUBLICATIONS

English language abstract and machine translation for EP2302226(A1) extracted from http://worldwide.espacenet.com database on May 10, 2018, 11 pages.

(Continued)

*Primary Examiner* — Gary W Estremsky
(74) *Attorney, Agent, or Firm* — Warner Norcross + Judd LLP

(57) ABSTRACT

An improved leveling bolt adapted to be received within an aperture defined by a panel is provided. The leveling bolt includes a threaded shaft, a base, and an obstruction. The base is joined to a first end of the threaded shaft. The obstruction is proximal to a second end of the threaded shaft and is adapted to engage the panel at the aperture during reversal of the threaded shaft from the aperture to prevent full withdrawal of the leveling bolt.

10 Claims, 4 Drawing Sheets

(56) References Cited

U.S. PATENT DOCUMENTS

| | | | |
|---|---|---|---|
| 8,038,376 B2 * | 10/2011 | Jung | F16B 39/30 |
| | | | 411/308 |
| 8,360,201 B2 | 1/2013 | Tanase | |
| 8,820,688 B2 * | 9/2014 | Nara | G03B 21/145 |
| | | | 248/188.2 |
| 2002/0106257 A1 * | 8/2002 | Braun | F16B 41/002 |
| | | | 411/353 |
| 2006/0039774 A1 * | 2/2006 | Lee | F16B 41/002 |
| | | | 411/378 |
| 2009/0223985 A1 | 9/2009 | Carmody et al. | |

OTHER PUBLICATIONS

Samsung Parts, DG61-0052B Leg-Leveling, retrieved from http:/www.samsungparts.com/DG61-00525B.html database on Apr. 20, 2018, 3 pages.

\* cited by examiner

LEVELING BOLT AND RELATED METHODS

FIELD OF THE INVENTION

The present disclosure generally relates to equipment leveling devices and, more specifically, to leveling bolts, also called leveling screws, leveling feet, or leveling legs, that are configured to facilitate leveling of household appliances and/or office furniture.

DESCRIPTION OF THE RELATED ART

Leveling bolts are used in various industries to level devices. For example, leveling bolts may be used to level a household oven or various other household appliances.

Known leveling bolts are configured for threadable engagement within an aperture defined in a panel at the bottom of a household appliance. The leveling bolts typically include a threaded shaft connected at a first end to a base, and a nut threadably engaged with the threaded shaft.

Despite their advantages, known leveling bolts can fall from the panel aperture during shipping due to vibrations or as a consequence of improper installation.

SUMMARY OF THE INVENTION

An improved leveling bolt is provided. The leveling bolt is adapted to be received within a panel aperture and includes a threaded shaft, a base, and an obstruction. The base is joined to a first end of the threaded shaft. The obstruction is proximal to a second end of the threaded shaft and is adapted to engage the panel at the panel aperture during reversal of the threaded shaft from the panel aperture to prevent full withdrawal of the leveling bolt.

In one embodiment, the obstruction includes a resilient locking arm positioned within a pitch between adjacent threads of the threaded shaft. The resilient locking arm includes an end portion, a body portion, and a front portion, wherein the front portion is secured to a thread and the end portion is enlarged with respect to the body portion.

In another embodiment, the obstruction includes a plurality of unidirectional barbs positioned atop the threaded shaft. The plurality of unidirectional barbs are optionally resilient frusto-conical projections having a diameter greater than a diameter of the panel aperture, optionally defining an axial slit extending therethrough.

In another embodiment, the threaded shaft includes threads that include at least one axially extending protrusion. The threaded shaft includes at least a second protrusion extending from a surface of a thread and positioned to be axially opposed to a first protrusion such that the first protrusion and the second protrusion define a narrow gap therebetween.

In another embodiment, the leveling bolt includes an alignment extension coaxial with the threaded shaft that includes a maximum cross-sectional dimension less than or equal to a diameter of the shaft proximal to the second end. The leveling bolt is optionally manufactured of a polymeric material, optionally having a monolithic construction.

A method of installing the leveling bolt includes inserting a leveling bolt having an alignment extension through the panel aperture until the threaded shaft contacts the panel aperture. The method further includes partially threadably engaging the threaded shaft within the panel aperture such that the obstruction passes through the panel aperture and prevents threadable disengagement of the leveling bolt from the panel aperture and further prevents non-destructive removal of the leveling bolt from the panel aperture.

Another embodiment of the invention includes a method of leveling a household appliance including first installing at least one leveling bolt within the appliance according to the method described above to give at least one installed leveling bolt. The method further comprises tightening and/or loosening the at least one installed leveling bolt until the appliance is level.

As described further below, the leveling bolt includes structure for obstructing removal of the leveling bolt from a panel aperture subsequent to installation. This eliminates the eventuation of a previously commonly encountered scenario wherein a leveling bolt falls out of a panel aperture during shipping. Moreover, the leveling bolt optionally includes an alignment extension to facilitate proper installation of the leveling bolt by a user.

These and other features and advantages of the present disclosure will become apparent from the following description of particular embodiments, when viewed in accordance with the accompanying drawings and appended claims.

DETAILED DESCRIPTION OF THE INVENTION

Figure 1:
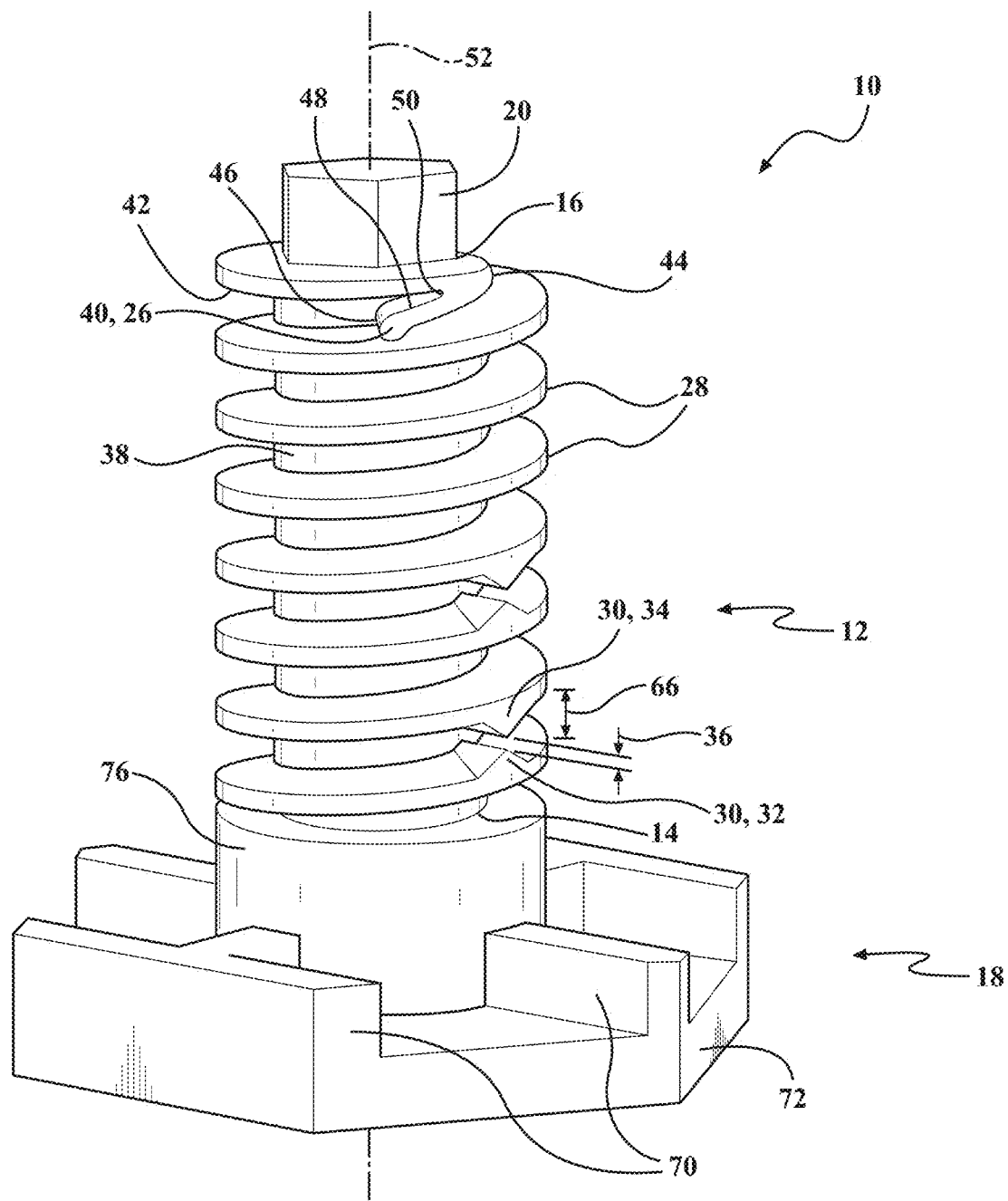
FIG. 1 is a perspective view of a leveling bolt in accordance with a first embodiment.
Figure 2:
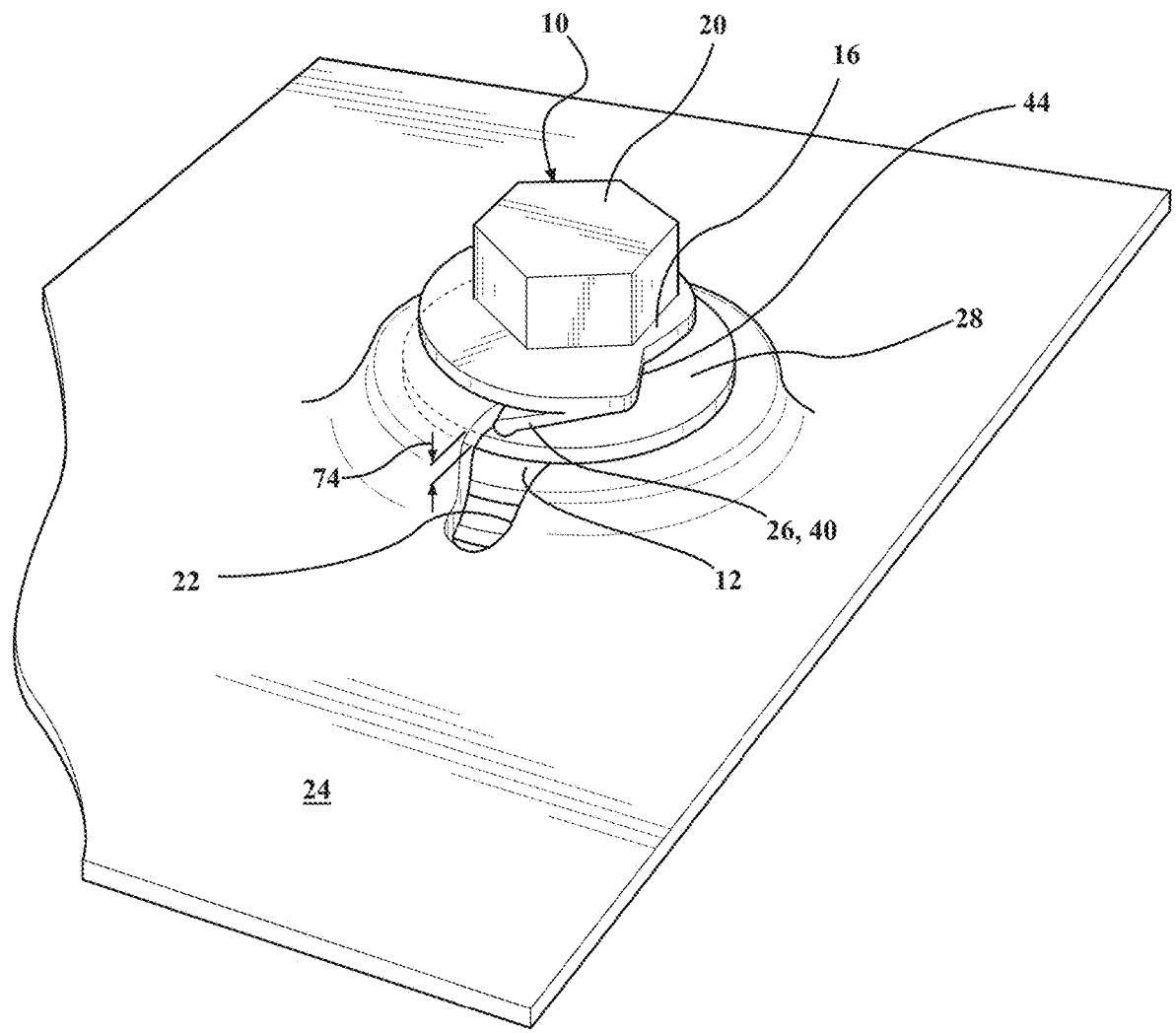
FIG. 2 is an environmental perspective view of the leveling bolt of FIG. 1 being installed within a panel aperture.

Referring to FIGS. 1-2, wherein like numerals indicate corresponding parts throughout the several views, a first embodiment of a leveling bolt is illustrated and generally designated 10. Certain features of the leveling bolt 10 are functional, but can be implemented in different aesthetic configurations. The leveling bolt 10 is configured to be disposed (e.g. inserted) within an aperture 22 defined by a panel 24 for leveling an appliance (not shown) to which the panel 24 is secured. Optionally, the panel 24 is disposed on a bottom surface of the appliance such that the leveling bolt 10, when installed, functions as a leg of adjustable length or height for the appliance.

In general, the leveling bolt 10 includes a threaded shaft 12, a base 18 joined to a first end 14 of the threaded shaft 12, and an obstruction 26 proximal to a second end 16 of the threaded shaft 12.

More specifically, the threaded shaft 12 includes a shaft 38 that extends lengthwise along an axis 52 between the first end 14 and the second end 16 of the threaded shaft 12. The threaded shaft 12 includes a shaft 38 from which a thread 28 radially extends from and about the shaft 38, progressing in a helical manner from the first end 14 to the second end 16. While illustrated herein as a single, continuous thread 28 radially extending from the shaft 38, the continuity or singularity of the thread 28 is not limited. Rather, the threaded shaft 12 may comprise multiple (e.g. 2, 3, 4, 5 or more) independently selected threads 28. Optionally, an axial distance 66 between helices defined by the thread 28 is equal to or greater than a thickness 74 of the panel 24.

Typically, the shaft 38 defines a diameter less than or equal to a diameter defined by the aperture 22. The thread 28 extends radially from the shaft 12 to define a diameter, measured through the axis 38 of the shaft 52, that is greater than the diameter of the aperture 22. As illustrated herein, the shaft 38 may define a single diameter along a length of the threaded shaft 12. However, such a configuration is not limiting, such that the shaft 38 may define multiple independently selected diameters. Similarly, the thread 28 may define a single diameter as illustrated herein, or may define multiple independently selected diameters along the threaded shaft 12.

In some embodiments, the threaded shaft 12 includes at least one axially extending protrusion 30. However, the threaded shaft 12 may include multiple axially extending protrusions 30, such as 2, 3, 4, 5, or more. Typically, the axially extending protrusions 30 extend axially from the thread 28. For example, in certain embodiments, the axially extending protrusions 30 include first protrusions 32 extending axially toward the second end 16 of the threaded shaft 12, and second protrusions 34 extending axially toward the first end 14. In such embodiments, the second protrusions 34 are typically positioned to be axially opposed to the first protrusion 32 such that a pair including one of each of the first protrusions 32 and the second protrusions 34 define a gap 36 therebetween.

As introduced above, the leveling bolt 10 includes the base 18 joined to the first end 14 of the threaded shaft 12. The base 18 has a cross-section that may define any shape, such as a polygonal shape (e.g. hexagonal) or a circular shape. Typically, the base 18 includes a generally planar portion 72 and reinforcing flanges 70 extending therefrom. The base 18 includes a central cylindrical rod 76 coaxially extending between and joining the planar portion 72 and the first end 14 of the threaded shaft 12. In this fashion, the central cylindrical rod 76 extends beyond the flanges 70 and serves as the point of connection between the threaded shaft 12 at the first end 14 to the base 18. The central cylindrical rod 76 of the base 18 optionally defines a diameter generally equivalent to an outer diameter of the threaded shaft 12.

As introduced above, the leveling bolt 10 also includes the obstruction 26. The obstruction 26 includes a resilient locking arm 40 positioned within a pitch between axially opposed radial extensions of the thread 28 of the threaded shaft 12. The locking arm 40 extends from a surface 42 of the thread 28 facing generally in the direction of the first end 14 of the threaded shaft 12. In some embodiments, the locking arm 40 extends from a terminal portion 44 of the thread 28 of the threaded shaft 12, e.g. proximal to the second end 16 of the threaded shaft 12. In certain embodiments, the leveling bolt 10 comprises a plurality of locking arms 40 positioned at various locations of or within the threaded shaft 12. The locking arm 40 includes an end portion 46, a body 48, and a front portion 50. Typically, the body 48 is connected to and extends between the end portion 46 and the front portion 50. Moreover, front portion 50 is typically connected to the thread 28 of the threaded shaft 12. In some embodiments, the end portion 46 is enlarged with respect to the body portion 48. In these or other embodiments, the end portion 46 defines a generally curved or circular side profile (e.g. when viewed from a side of the threaded shaft 12). In such embodiments, the end portion 46 is typically connected to the body portion 48 generally at a side portion thereof. In specific embodiments, the end portion 46 comprises a circular profile. The locking arm 40 generally extends at an angle from the front portion 50 in the direction of a surface of the thread 28 opposing the surface 42 to which the locking arm 40 is attached. Moreover, the locking arm 40 extends from the surface 42 in a manner such that the front portion 50 of the locking arm 40 is more proximal to the end 44 along the extension of the thread 28, and the end portion of the locking arm 40 is most proximal to the second end 16 of the threaded shaft 12 along the extension of the thread 28 (i.e., distal to the end 44 relative to the front portion 50). In some embodiments, the locking arm 40 is only attached to the threaded shaft 12 at the front portion 50 and includes a spring constant. The locking arm 40 is optionally configured such that the leveling bolt 10 cannot be non-destructively uninstalled subsequent to achieving an installed configuration within the aperture 22 defined by the panel 24, as shown in FIG. 2 and described further below.

In certain embodiments, the leveling bolt 10 includes an alignment extension 20 coaxial with and secured to the shaft 38 of the threaded shaft 12. The alignment extension 20 functions to assist in proper alignment of the threaded shaft 12 within the aperture 22 prior to tightening of the leveling bolt 10 within the aperture 22. The alignment extension 20 may define any cross-sectional shape, such as a polygonal shape (e.g. hexagonal) or a circular shape, and may include a maximum cross-sectional dimension less than the diameter of the shaft 38.

Figure 3:
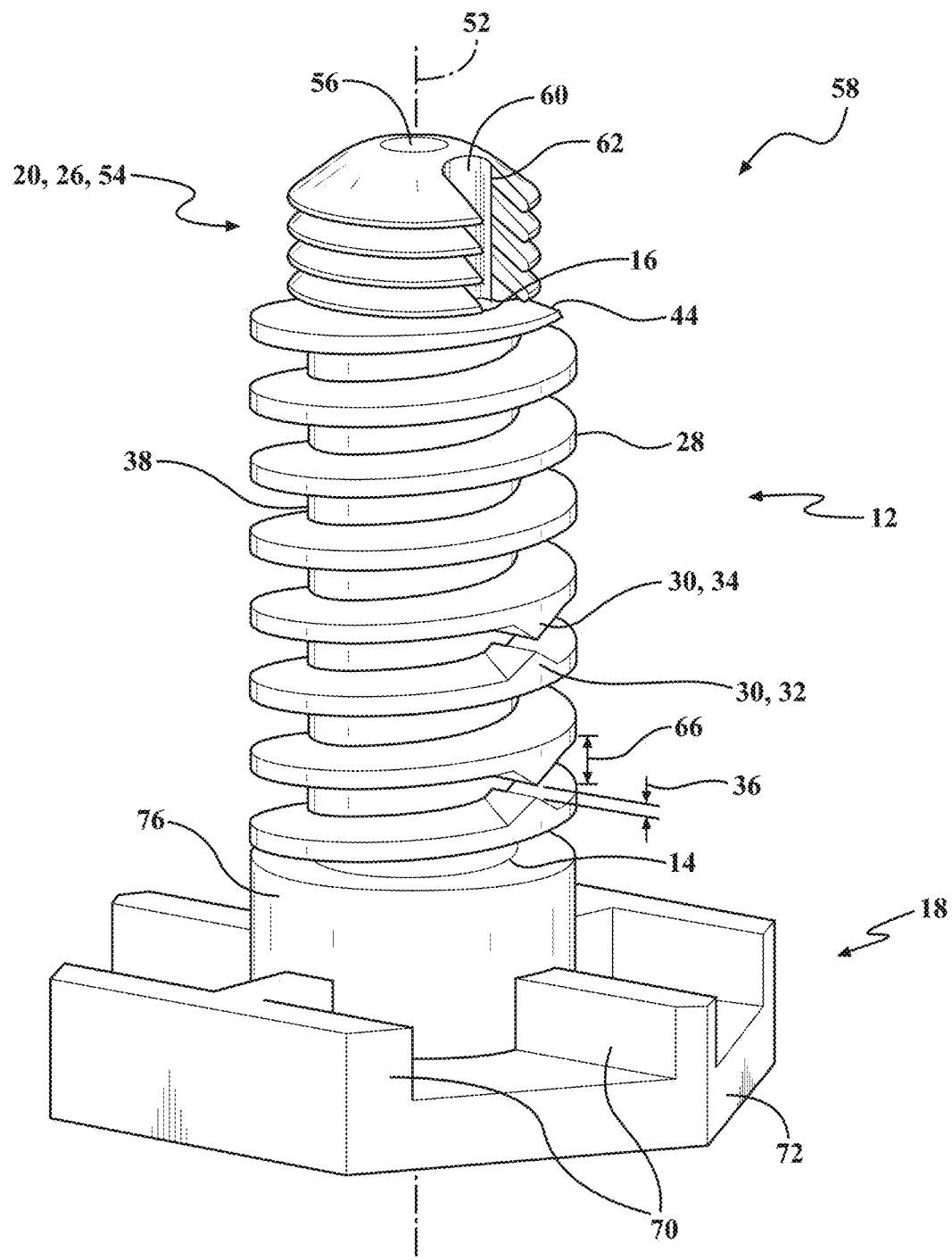
FIG. 3 is a perspective view of a leveling bolt in accordance with a second embodiment.
Figure 4:
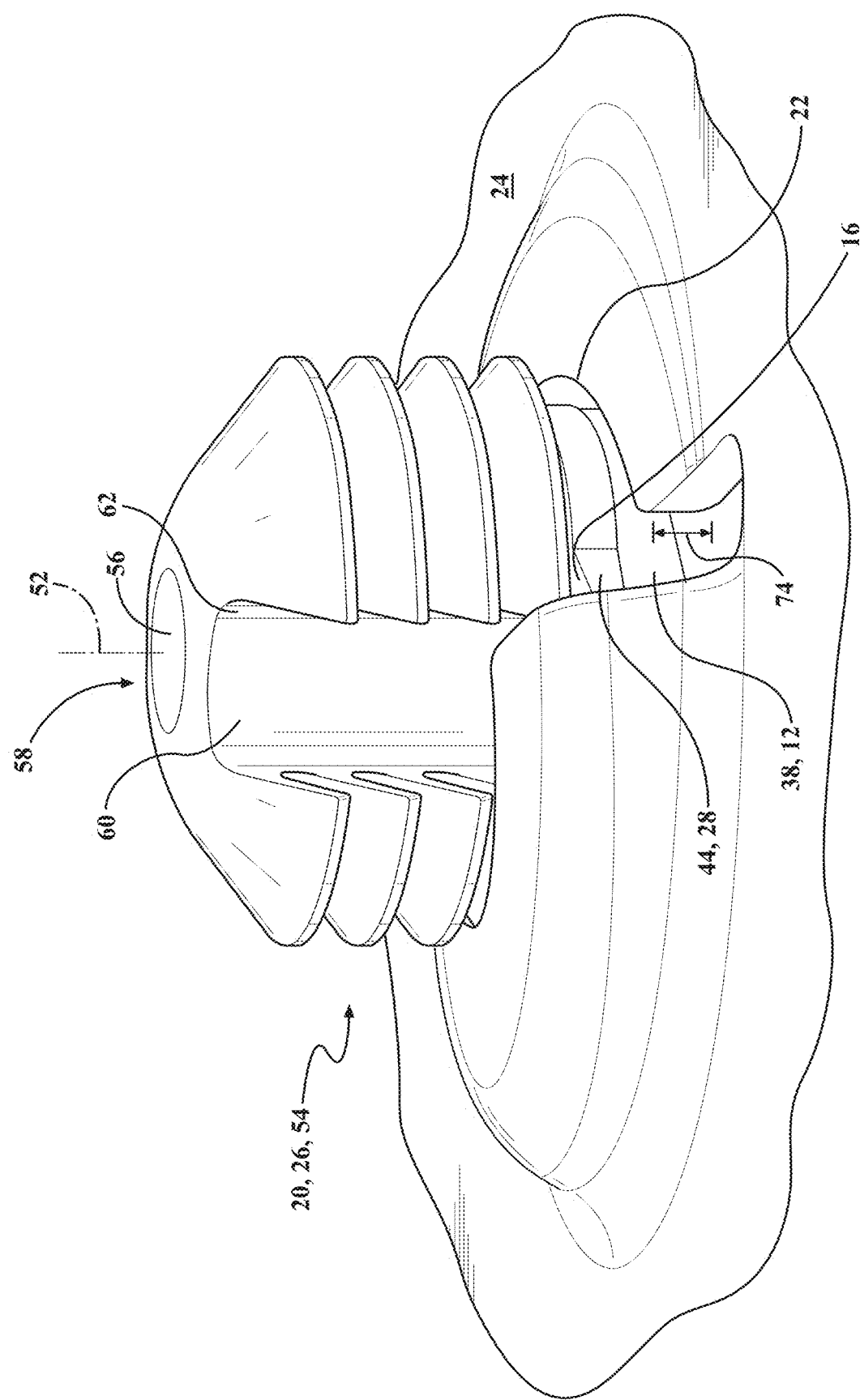
FIG. 4 is an environmental perspective view of the leveling bolt of FIG. 3 being installed within a panel aperture.

Referring to FIGS. 3-4, wherein like numerals indicate corresponding parts throughout the several views, a second embodiment of a leveling bolt is illustrated and generally designated 58. Certain features of the leveling bolt 58 are functional, but can be implemented in different aesthetic configurations. The leveling bolt 58 is configured to be disposed (e.g. inserted) within the aperture 22 defined by the panel 24 for leveling an appliance to which the panel 24 is secured. Optionally, the panel 24 at least partially defines a bottom surface of the appliance such that the leveling bolt 10, when installed, serves as a leg of adjustable length for the appliance.

The second embodiment of the leveling bolt 58 is identical to the first embodiment with the exception that in the second embodiment, the obstruction 26 does not include a locking arm 40, but rather includes a special alignment extension 20. The alignment extension 20 includes barbs 54, which perform a similar function (e.g. obstruction) to locking arm 40, while also forming part of the alignment extension 20. More specifically, the barbs 54 extend from an outer surface 60 of an internal rod 56 that is coaxial with and connected to the second end 16 of the shaft 38. Optionally, the rod 56 is cylindrical and includes a diameter equal to or less than the diameter of the shaft 38. Typically, the rod 56 terminates to form a concave, conical, or convex surface to help facilitate insertion of the alignment extension 20 within the aperture 22 and proper alignment therewith.

The barbs 54 are positioned atop the threaded shaft 12, and advantageously function to obstruct withdrawal of the leveling bolt 58 from the aperture 22 once installed, even prior to partial tightening of the leveling bolt 58 during installation. Additionally, the barbs 54 are typically configured such that the leveling bolt 10 cannot be non-destructively uninstalled subsequent to achieving an installed configuration, as shown in FIG. 4 and described further below, within an aperture 22 defined by a panel 24. The barbs 54 are typically resilient frusto-conically-shaped projections that slope toward the base 18 of the leveling bolt 58 and have a diameter greater than a diameter of the aperture 22. The configuration of barbs 54 as shown in FIGS. 3 and 4 may be also referred to as a fir tree mount 54. The number of barbs 54, and the spacing between the barbs 54, are not limited, and are each typically independently selected, e.g. based on the intended use of the leveling bolt 58.

In some embodiments, the barbs 54 include an axial slit 60 running therethrough, which is typically positioned such that one side of the slit 60 is radially opposed to the terminal end 44 of the thread 28 proximal to the second end 16 of the threaded shaft 12, so as to obstruct threaded removal of the leveling bolt 58 from the aperture 22 after installation, as shown in FIG. 4. In such embodiments, the slit 60 may penetrate into the rod 56 in addition to intersecting the barbs 54. The slit 60 may comprise any height, depth, and/or width, which are each independently selected and limited only by what is necessary in order for the obstruction 26 to properly achieve the intended function of obstructing threaded removal of the leveling bolt 58 from the aperture 22 after installation.

Typically, the aperture 22 defined by the panel 24 includes threading so as to be threadably engaged by the threaded shaft 12, or is defined by a semi-helical impression of the panel 24 so shaped as to be threadably engaged by the threaded shaft 12. The threading of the aperture 22 preferably includes blunt ends as opposed to pointed or sharp ends so as best to engage with the obstruction 26. In other words, the panel 24 impression 22 or threaded aperture 22 is so configured as to properly engage the obstruction 26 of the leveling bolt 10, 58.

To install the leveling bolt 10, 58, thereby achieving an installed configuration as depicted in FIGS. 2 and 4, the leveling bolt 10, 58 is provided. As described above, the leveling bolt 10, 58 includes the alignment extension 20. The alignment extension 20 of the leveling bolt 10, 58 is then inserted through the aperture 22 defined by the panel 24 until the threaded shaft 12 contacts the panel 24. The threaded shaft 12 is then partially threadably engaged within the aperture 22 such that the obstruction 26 prevents threadable disengagement of the leveling bolt 10, 58 from the aperture 22 defined by the panel 24, thus preventing removal of the leveling bolt 10, 58 from the aperture 22 defined by the panel 24.

The leveling bolt 10, 58 may be used to level an appliance (e.g. household oven, stove, refrigerator, washing machine, etc.) comprising a panel (e.g. the panel 24) defining an aperture (e.g. aperture 22). The leveling bolt 10, 58 may alternatively or additionally be used to level furniture, e.g. residential or office furniture. In particular, to level the appliance, at least one leveling bolt 10, 58 is installed within the aperture 22 defined by the panel 24 of the appliance to give at least one installed leveling bolt 10, 58. The at least one installed leveling bolt 10, 58 is then tightened or loosened until the appliance is adequately level. More specifically, the installed leveling bolt 10, 58 may function as an adjustable leg of the appliance, such that tightening the installed leveling bolt 10, 58 lowers a portion of the appliance toward the ground and, conversely, loosening the installed leveling bolt 10, 58 raises the portion of the appliance away from the ground. In this fashion, a plurality of the leveling bolt 10, 58 may be installed in the appliance to give a plurality of installed leveling bolts 10, 58, each at a different portion of the appliance. Each of these installed leveling bolts 10, 58 is then individually tightened and/or loosened to level the appliance by bringing each of the different portions to a level configuration relative each other, and thus placing the appliance in a leveled condition or position.

Notably, the protrusions 30 in the threaded shaft 12 function to inhibit further tightening or loosening of the leveling bolt 10, 58 subsequent to leveling of the appliance so as to securely maintain the appliance in the leveled condition. The base 18 of the leveling bolt 10, 58 is so shaped as to both ergonomically facilitate the loosening and tightening of the leveling bolt 10, 58 within the aperture 22 and also to obstruct overtightening of the leveling bolt 10, 58 within the aperture 22. Moreover, the base 18 is optionally shaped as to be engaged by a tool (e.g. a wrench) for assisted tightening and/or loosening of the leveling bolt 10, 58.

The various elements of the components of the embodiments of the leveling bolt 10, 58 described above, e.g. the threaded shaft 12, the base 18, the obstruction 26, and the alignment extension 20, may be manufactured of the same or different material(s), such as any one or more of the materials described below. Typically, the leveling bolt 10, 58 is monolithic in construction and homogeneous in composition. However, the leveling bolt 10, 58 may comprise multiple components joined together. Moreover, each component may itself comprise a combination of different materials, and thus may not comprise a homogeneous composition throughout. In general, materials suitable for use in or as the leveling bolt 10, 58 (e.g. the threaded shaft 12, base 18, obstruction 26, or alignment extension 20) include metals (e.g. steels, aluminums, alloys, etc.), resins (e.g. thermoset and/or thermoplastic resins), and combinations thereof. However, myriad materials may be used to manufacture the elements of the leveling bolt 10, 58, each typically selected as a function of availability, cost, performance/end use applications, etc. Moreover, metals, metal alloys, resins are not exhaustive of suitable materials that may be used.

In some embodiments, the leveling bolt 10, 58 comprises a resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the word "panel" as used herein is not to be limiting and encompasses the concepts of "plates" and various other components including a thickness 74 and defining the aperture 22 within which the leveling bolt 10, 58 may be installed.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:

1. A leveling bolt adapted to be received within a panel aperture, the leveling bolt comprising:
   a threaded shaft including a first end and a second end;
   a base joined to the first end of the threaded shaft; and
   an obstruction proximal to the second end of the threaded shaft, wherein the obstruction is adapted to engage the panel at the panel aperture during reversal of the threaded shaft from the panel aperture to prevent full withdrawal of the leveling bolt;
   wherein the obstruction includes an integral resilient arm positioned within a pitch between adjacent threads of the threaded shaft; and
   wherein the obstruction has a spring constant.

2. The leveling bolt of claim 1, wherein the resilient arm extends from a terminal portion of a thread of the threaded shaft.

3. The leveling bolt of claim 2, wherein the resilient arm includes an end portion, a body portion, and a front portion, wherein the front portion is secured to the thread and the end portion is enlarged with respect to the body portion.

4. The leveling bolt of claim 1, wherein the threaded shaft includes a first protrusion axially extending from a surface of a thread.

5. The leveling bolt of claim 4, wherein the threaded shaft includes a second protrusion extending from a surface of a thread and positioned to be axially opposed to the first protrusion such that the first protrusion and the second protrusion together define a gap therebetween.

6. The leveling bolt of claim 1, wherein: (i) the leveling bolt is monolithic in construction; (ii) the leveling bolt comprises a polymeric material; or (iii) both (i) and (ii).

7. A method of installing a leveling bolt, comprising:
   providing the leveling bolt, wherein the leveling bolt is the leveling bolt of claim 6;
   inserting the alignment extension of the leveling bolt through the panel aperture until the threaded shaft contacts the panel aperture; and
   partially threadably engaging the threaded shaft within the panel aperture such that the obstruction prevents threadable disengagement of the leveling bolt from the panel aperture and further prevents removal of the leveling bolt from the panel aperture.

8. The leveling bolt of claim 1, wherein the threaded shaft includes a shaft from which a thread radially extends from and about the shaft, and wherein the leveling bolt further includes an alignment extension coaxial with the threaded shaft and including a maximum cross-sectional dimension less than or equal to a diameter of the shaft proximal to the second end.

9. A method of installing a leveling bolt, comprising:
   providing the leveling bolt, wherein the leveling bolt is the leveling bolt of claim 1;
   inserting the leveling bolt through the panel aperture until the threaded shaft contacts the panel aperture; and
   partially threadably engaging the threaded shaft within the panel aperture such that the obstruction prevents threadable disengagement of the leveling bolt from the panel aperture and further prevents removal of the leveling bolt from the panel aperture.

10. A method of leveling an appliance, comprising the steps of:
    installing the leveling bolt within the appliance according to the method of claim 9 to give at least one installed leveling bolt; and
    tightening and/or loosening the at least one installed leveling bolt until the appliance is level.

* * * * *